(12) United States Patent
Fearis et al.

(10) Patent No.: US 11,774,604 B2
(45) Date of Patent: Oct. 3, 2023

(54) WEARABLE RADON DETECTOR

(71) Applicant: Spruce Environmental Technologies, Inc., Ward Hill, MA (US)

(72) Inventors: Mark David Fearis, Ward Hill, MA (US); John Patrick DeChristopher, Ward Hill, MA (US)

(73) Assignee: Spruce Environmental Technologies, Inc., Ward Hill, MA (US)

( * ) Notice: Subject to any disclaimer, the term of this patent is extended or adjusted under 35 U.S.C. 154(b) by 0 days.

(21) Appl. No.: 17/742,302

(22) Filed: May 11, 2022

(65) Prior Publication Data

US 2022/0365229 A1    Nov. 17, 2022

Related U.S. Application Data

(60) Provisional application No. 63/188,712, filed on May 14, 2021.

(51) Int. Cl.
*G01T 1/178* (2006.01)

(52) U.S. Cl.
CPC .................. *G01T 1/178* (2013.01)

(58) Field of Classification Search
CPC .. G01T 7/00; G01T 1/178; G01T 5/02; G01T 7/02; G01K 1/14
See application file for complete search history.

(56) References Cited

U.S. PATENT DOCUMENTS 3,505,523 A * 4/1970 Becker ............... G01T 5/10
250/DIG. 2
4,518,860 A   5/1985 Alter
4,920,272 A   4/1990 Yoder
(Continued)

FOREIGN PATENT DOCUMENTS

WO   WO2005086605 A2   9/2005
WO    2020006377 A1    1/2020

OTHER PUBLICATIONS

Tamakuma Y. et al, Passive-Type Radon Monitor Constructed Using a Small Container for Personal Dosimetry, Environmental Research and Public Health, Aug. 5, 2020.

*Primary Examiner* — David P Porta
*Assistant Examiner* — Fani Polyzos Boosalis
(74) *Attorney, Agent, or Firm* — Wolf, Greenfield & Sacks, P.C.

(57) ABSTRACT

A wearable radon detector is an apparatus that measures radon exposure around a user. The apparatus includes a housing, an elongated plate, and a radon-detecting foil strip. The housing contains the elongated plate and the radon-detecting foil strip. The elongated plate positions and maneuvers the radon-detecting foil strip. The housing includes a receptacle portion, a storage portion, a first breakaway line, a plate-receiving slot, and a plurality of air passages. The elongated plate includes a grasping member, a setting member, and a second breakaway line. Radon collects within the receptacle portion through the plurality of air passages. The storage portion shields the radon-detecting foil strip once setting member has been slid from the receptacle portion and into the storage portion, the receptacle portion has been separated from storage portion along the first breakaway line, and the grasping member has been separated from the setting member along the second breakaway line.

19 Claims, 11 Drawing Sheets

(56) References Cited

U.S. PATENT DOCUMENTS

| | | | |
|---|---|---|---|
| 4,926,053 A | * | 5/1990 | Dempsey .................. G01T 1/14 |
| | | | 250/DIG. 2 |
| 4,999,503 A | | 3/1991 | Andru |
| 5,070,247 A | | 12/1991 | Wiblin |
| 5,572,020 A | | 11/1996 | Alvarez |

* cited by examiner

WEARABLE RADON DETECTOR

The current application claims a priority to the U.S. Provisional Patent application Ser. No. 63/188,712 filed on May 14, 2021.

FIELD OF THE INVENTION

The present invention generally relates to radon detection equipment. More specifically, the present invention is a wearable radon detector.

BACKGROUND OF THE INVENTION

Radon is one of if not the largest contributor to background radiation dosage. Studies have shown a clear link between radon and lung cancer. There are radon testing kits available, but they are mainly for stationary and indoor use. It is an object of the present invention to improve radon measurement versatility by providing users with a device that can in addition to being placed, can be hung, worn on the person, or attached via a lanyard or similar means. In any of these applications, the device measures long term radon exposure.

The present invention is a passive device that is used to measure long term radon exposure. The present invention uses a diffusion-based track detection technology adopted from the legacy Alpha Track product. The present invention will accurately measure radon for a duration of 91 to 365 days. As with the legacy product, the foil must be returned to the lab for analysis to determine the average radon concentration that was present over the duration of the exposure.

DETAILED DESCRIPTIONS OF THE INVENTION

All illustrations of the drawings are for the purpose of describing selected versions of the present invention and are not intended to limit the scope of the present invention.

The present invention is a wearable radon detector. The present invention readily receives radon present in an environment or area. The present invention visually alerts a verified lab analyst or technician of the presence of radon in an environment or area associated with the corresponding wearable radon detector. The present invention is not reusable for the safety of a user with the present invention. In order for radon to be detected with the present invention while being worn by a user, the present invention comprises a housing 1, an elongated plate 18, and a radon-detecting foil strip 28, seen in FIG. 1, FIG. 3, FIG. 4, FIG. 6, FIG. 7, FIG. 9, and FIG. 10. The housing 1 contains the elongated plate 18 and the radon-detecting foil strip 28. The housing 1 comprises a receptacle portion 2, a storage portion 3, a first breakaway line 4, a plate-receiving slot 5, and a plurality of air passages 6. The receptacle portion 2 allows radon to collect within the housing 1 and come into contact with the radon-detecting foil strop. The storage portion 3 shield the radon-detecting foil strip 28 while not in use and during transportation for accurate analysis at a verified laboratory. The first breakaway line 4 serves as a perforated line that allows the receptacle portion 2 to be readily detached from a storage portion 3 while preserving the connection between the receptacle portion 2 and the storage portion 3 while in still in an activated configuration, readily collecting or ready to collect radon, seen in seen in FIG. 1, FIG. 2, FIG. 3, FIG. 7, and FIG. 8. Furthermore, the first breakaway line 4 preserves the structural integrity of the housing 1 until the receptacle portion 2 is purposefully broken off by the user. The plate-receiving slot 5 provides passage for the elongated plate 18 into the housing 1 and allows the elongated plate 18 to linearly slide within the housing 1. The plurality of air passages 6 provides a path for radon into the housing 1 so that the radon may come into contact with the radon-detecting foil strip 28. The elongated plate 18 positions and maneuvers the radon-detecting foil strip 28 within the housing 1. Moreover, the elongated plate 18 allows a user to position the radon-detecting foil strip 28 from the receptacle portion 2 into the storage portion 3 without directly touching the radon-detecting foil strip 28. The elongated plate 18 comprises a grasping member 19, a setting member 20, and a second breakaway line 21. The grasping member 19 is the part of the elongated plate 18 that the user may engage to slide the radon-detecting foil strip 28 into the storage portion 3. The setting member 20 upholds radon-detecting foil strip 28. The second breakaway line 21 serves as a perforated line that allows the grasping member 19 to be readily detached from the setting member 20 while preserving the connection between the grasping member 19 and the setting member 20 while still in the activated configuration. Furthermore, the second breakaway line 21 preserves the structural integrity of the elongated plate 18 until the grasping portion is purposefully broken off by the user. The radon-detecting foil strip 28 provides visual evidence that radon was present in an associated environment or area. More specifically, radon that has entered into the housing 1 hits the foil and leaves indentations which definitively indicate the presence of radon.

The overall configuration of the aforementioned components effectively provides visual evidence of the presence of radon gas around a user. In order for the radon-detecting foil strip 28 to be continuously protected while being struck by radon and then throughout transportation, the receptacle portion 2 is fixed adjacent with the storage portion 3, seen in FIG. 1, FIG. 2, FIG. 3, FIG. 4, FIG. 5, FIG. 6, FIG. 7, FIG. 8, FIG. 9, and FIG. 10. The cost of postage for the transportation of the present invention from an associated environment or area to a verified laboratory is minimized as the first breakaway line 4 is positioned in between the receptacle portion 2 and the storage portion 3. The first breakaway line 4 is laterally integrated into and around the housing 1, thereby allow the receptacle portion 2 and the storage portion 3 to be separated without any additional tools. The grasping member 19 is readily accessible as the plate-receiving slot 5 traverses through the storage position and into the receptacle portion 2. The grasping member 19 is fixed adjacent with the setting member 20, allowing the setting member 20, and consequently the radon-detecting foil strip 28 to be maneuvered by the grasping member 19. The cost of postage for the transportation of the present invention from an associated environment or area to a verified laboratory is minimized further as the second breakaway line 21 is positioned in between the grasping member 19 and the setting member 20. The grasping member 19 may be separated from the setting portion without any additional tools as the second breakaway line 21 is laterally integrated into and around the elongated plate 18. As seen in FIG. 4, FIG. 5, FIG. 6, FIG. 9, FIG. 10, and FIG. 11, in order to position the setting member 20 into the storage portion 3 while in a stored configuration, not in use and ready to be analyzed, the elongated plate 18 is slidably engaged through the plate-receiving slot 5. In order for radon to have access to the radon-detecting foil strip 28 and for the radon-detecting foil strip 28 to be protected throughout transportation, the radon-detecting foil strip 28 is fixed across the setting member 20. Radon readily enters into the housing 1 as the plurality of air passages 6 traverses into the receptacle portion 2.

In order to facilitate the contact between radon gas and the radon-detecting foil strip 28, the housing 1 may further comprise a proximal surface 7, a distal surface 8, and a hemispherical basin 9, seen in FIG. 1, FIG. 4, FIG. 7, and FIG. 9. The proximal surface 7 is oriented towards the body of the user or any accessory the present invention is attached. The distal surface 8 is oriented away from the body for a continuous and smooth passage of radon into the housing 1. The hemispherical basin 9 maximizes the contact between radon and the radon-detecting foil strip 28 as the geometry of the hemispherical basin 9 causes the decay particles to refract against the inner surfaces of the hemispherical basin 9 and strike the radon-detecting foil. The elongated plate 18 is positioned within the housing 1 as the proximal surface 7 is positioned opposite the distal surface 8 about the housing 1. More specifically, the proximal surface 7 extends between the receptacle portion 2 and the storage portion 3. Likewise, the distal surface 8 extends between the receptacle portion 2 and the storage portion 3. As the receptacle portion 2 readily receives radon while in the activated configuration, the hemispherical basin 9 is positioned adjacent with the receptacle portion 2 and is integrated into the distal surface 8. In order for the decay particles to refract within the hemispherical basin 9, the plurality of air passages 6 traverses through the hemispherical basin 9. More specifically, each of the plurality of air passages 6 is oriented towards a focal detection area of the hemispherical basin 9.

In a preferred embodiment of the present invention, the setting member 20 is locked within the storage portion 3 while in a stored configuration as the housing 1 further comprises a first barb-receiving hole 10 and a second barb-receiving hole 11, seen in FIG. 1, FIG. 2, FIG. 3, FIG. 4, FIG. 5, and FIG. 6. Moreover, the elongated plate 18 may further comprise a first barb 22 and a second barb 23. The first barb-receiving hole 10 and the second barb-receiving hole 11 allows the first barb 22 and the second barb 23 to latch within the storage portion 3. More specifically, the first barb 22 and the second barb 23 may readily extend back into a natural position within the storage portion 3 once latched into place within the storage portion 3. In order for the setting member 20 to be completely surrounded by the storage portion 3 and the radon-detecting foil strip 28 to be securely protected while in the storage configuration, the first barb-receiving hole 10 and the second barb-receiving hole 11 laterally traverse through the storage portion 3 and into the plate-receiving slot 5. More specifically, the first barb-receiving hole 10 and the second barb-receiving hole 11 are positioned offset from the first breakaway line 4. The setting member 20 is evenly secured within the storage portion 3 as the first barb-receiving hole 10 and the second barb-receiving hole 11 are positioned opposite to each other about the plate-receiving slot 5. Furthermore, this arrangement prevents the setting portion from escaping through the plate-receiving slot 5. Likewise, the first barb 22 is laterally fixed to the setting member 20, and the second barb 23 is laterally fixed to the setting member 20, opposite to the first barb 22. This arrangement not only corresponds to the positions of the first barb-receiving hole 10 and the second barb-receiving hole 11 but prevents the setting portion from accidentally getting dislodged from within the storage portion 3.

The first barb 22 and the second barb 23 effectively lock the setting member 20 into the storage portion 3 as the housing 1 may further comprise a first barb-bracing stop 12 and a second barb-bracing stop 13, also seen in FIG. 1, FIG. 2, FIG. 3, FIG. 4, FIG. 5, and FIG. 6. The first barb-bracing stop 12 and the second barb-bracing stop 13 allows the first barb 22 and the second barb 23 to be latched within the setting member 20 and prevent the setting member 20 from exiting the storage portion 3 the way it entered. More specifically, the first barb-bracing stop 12 and the second barb-bracing stop 13 locks the setting member 20 within the storage portion 3 so that only a verified lab analyst or technician may be able to disable the storage portion 3. In order for the first barb 22 and the second barb 23 to directly contact or engage with the first barb-bracing stop 12 and the second barb-bracing stop 13, the first barb-bracing stop 12 and the second barb-bracing stop 13 are fixed within the receptacle portion 2. More specifically, the first barb-bracing stop 12 and the second barb-bracing stop 13 are positioned into the plate-receiving slot 5 and are positioned opposite to each other about the plate-receiving slot 5. The first barb-bracing stop 12 and the second barb-bracing stop 13 are positioned adjacent to the first breakaway line 4, thereby only engaging with the first barb 22 and the second barb 23 while in the stored configuration and not while in the activated configuration.

Figure 1:
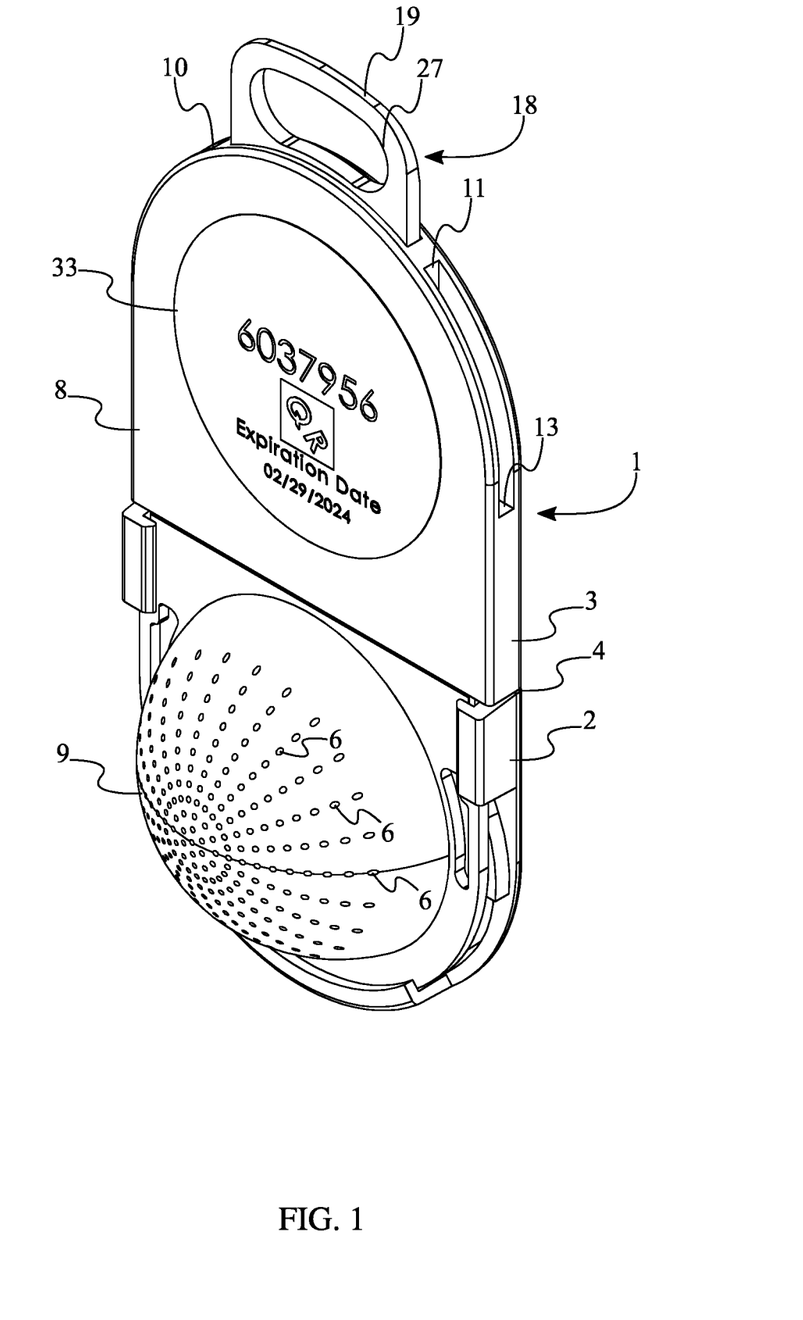
FIG. 1 is a perspective view of a preferred embodiment of the present invention in an activated configuration.
Figure 2:
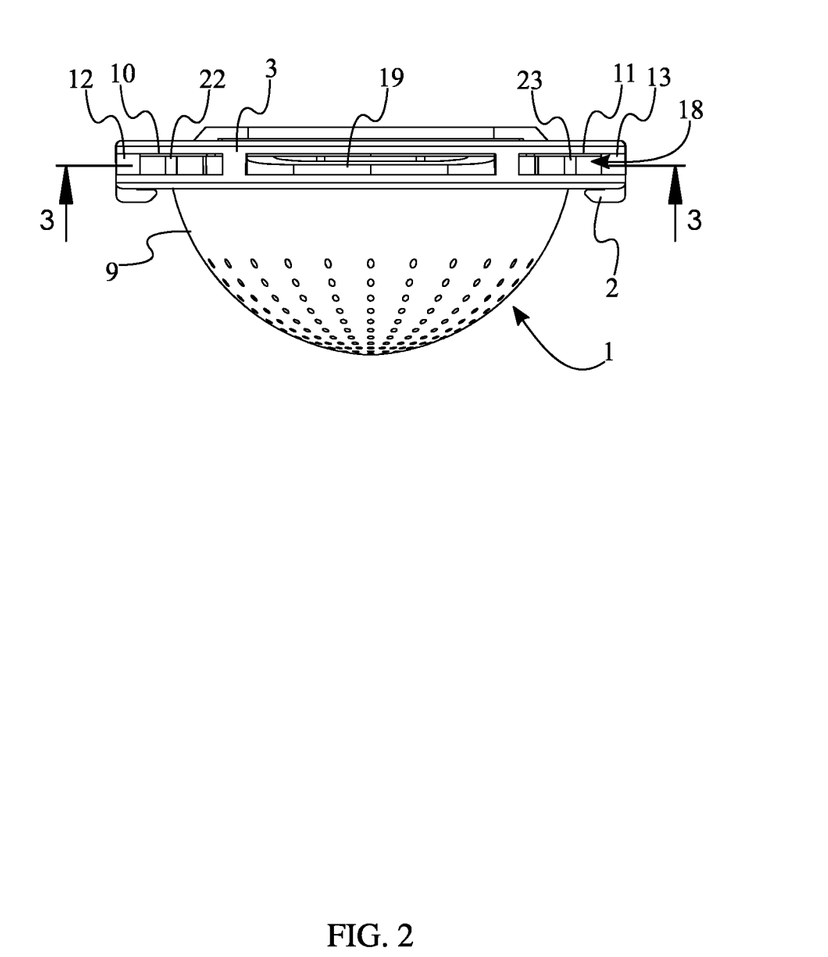
FIG. 2 is a top side view of the preferred embodiment of the present invention.
Figure 3:
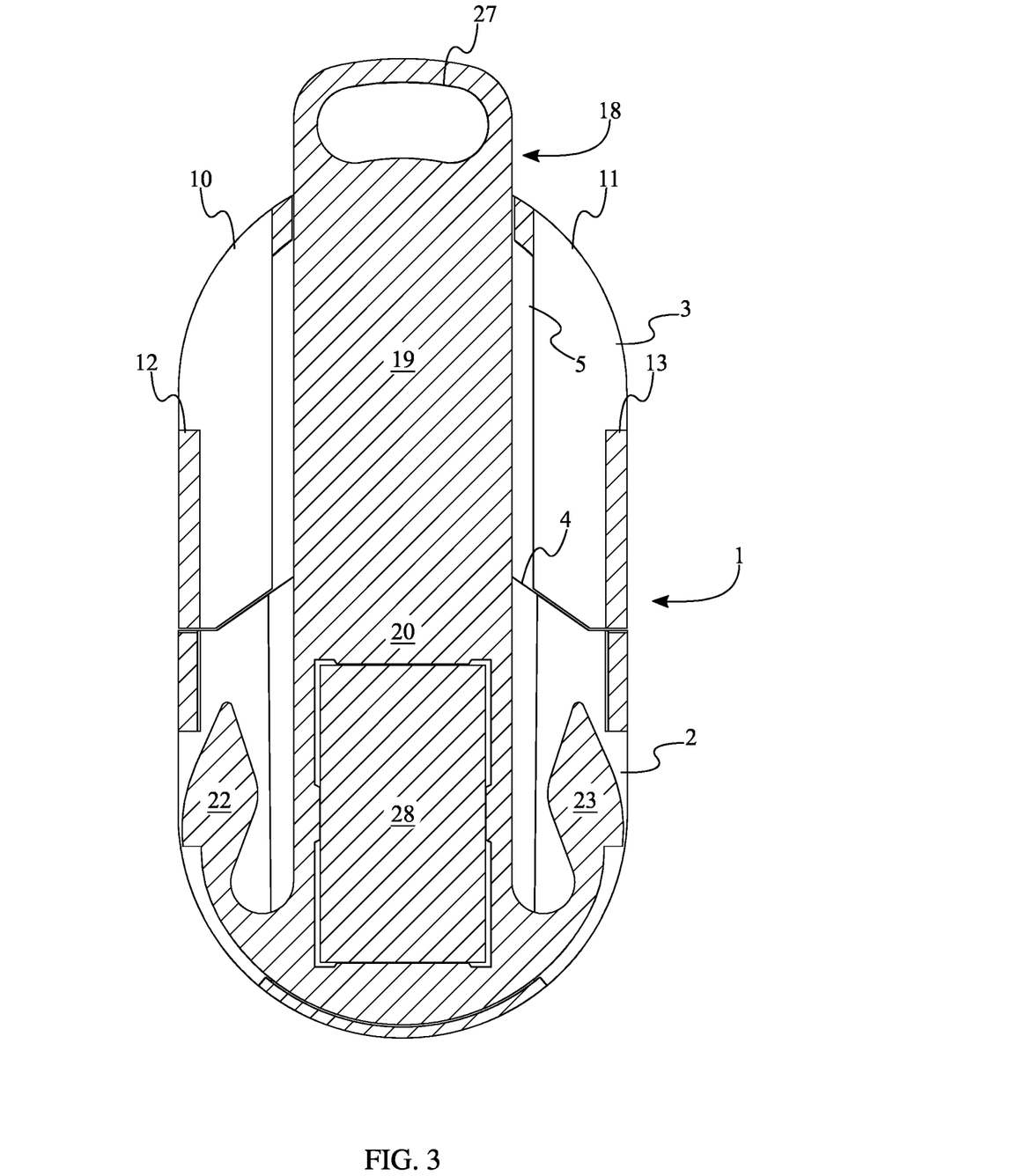
FIG. 3 is a cross-section view taken along line 3-3 in FIG. 2.
Figure 4:
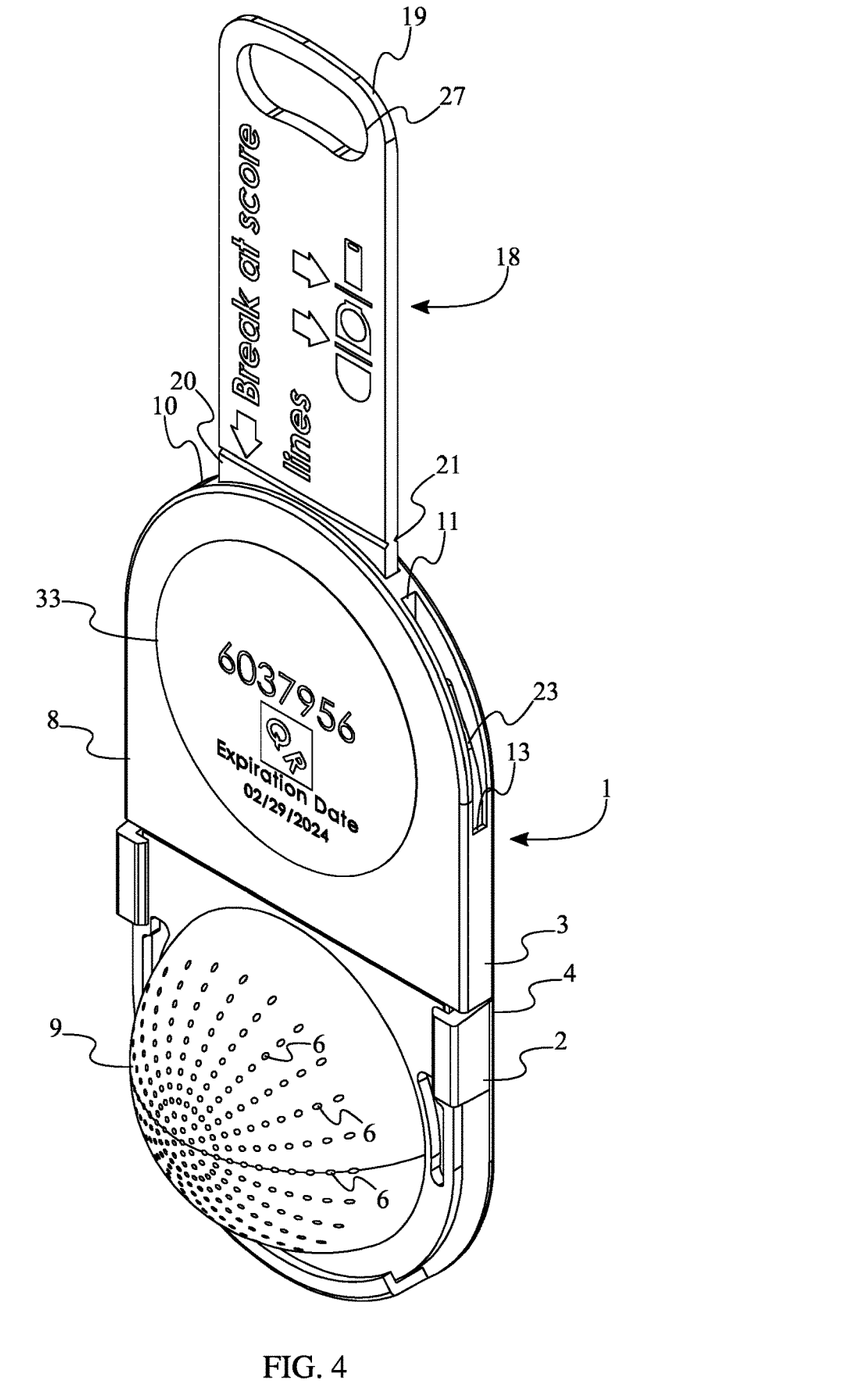
FIG. 4 is a perspective view of the preferred embodiment of the present invention in a stored configuration.
Figure 5:
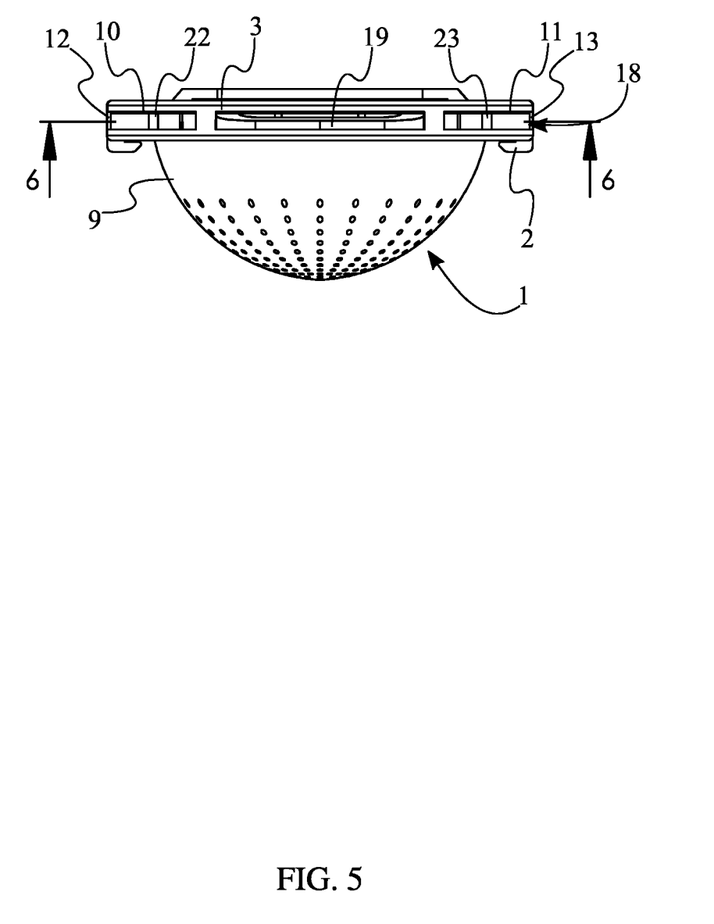
FIG. 5 is a top side view of the preferred embodiment of the present invention.
Figure 6:
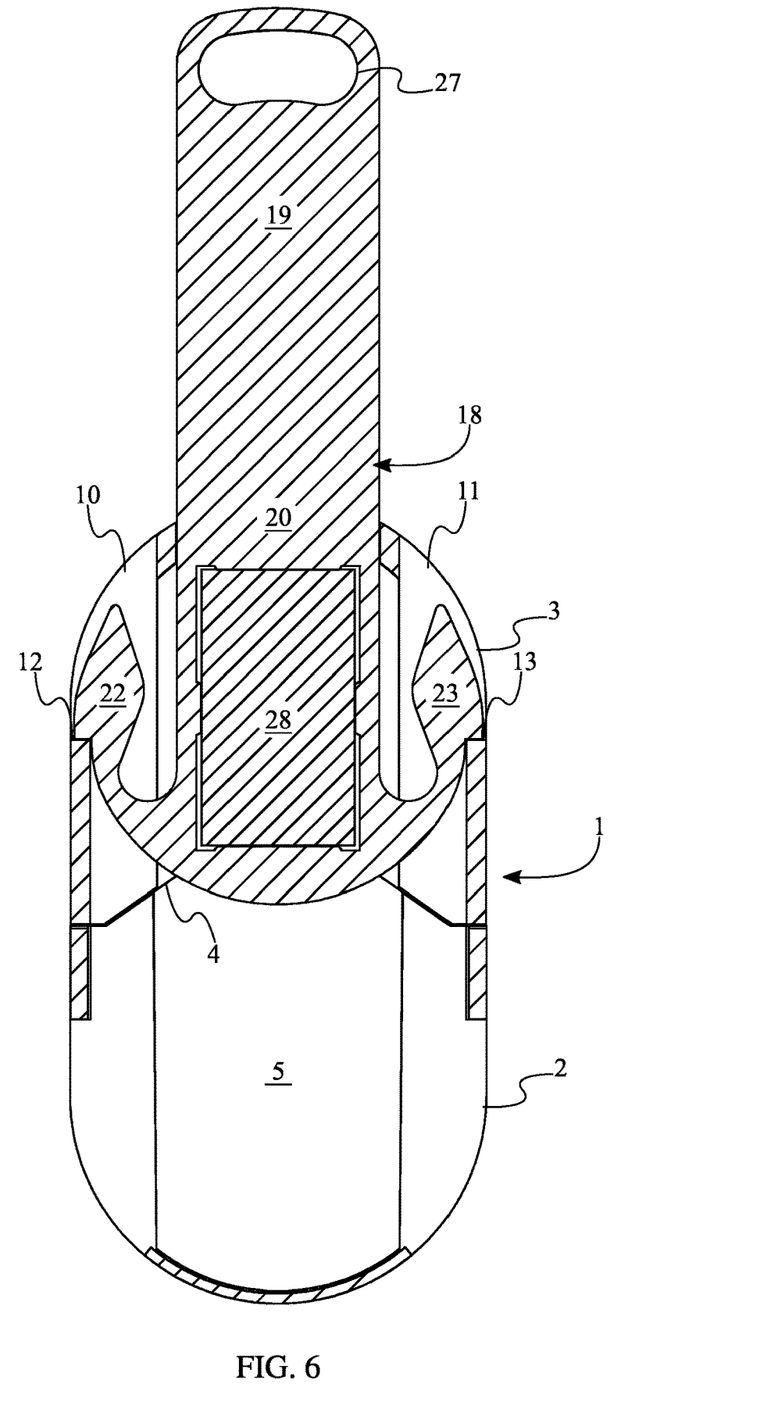
FIG. 6 is a cross-section view taken along line 6-6 in FIG. 5.
Figure 7:
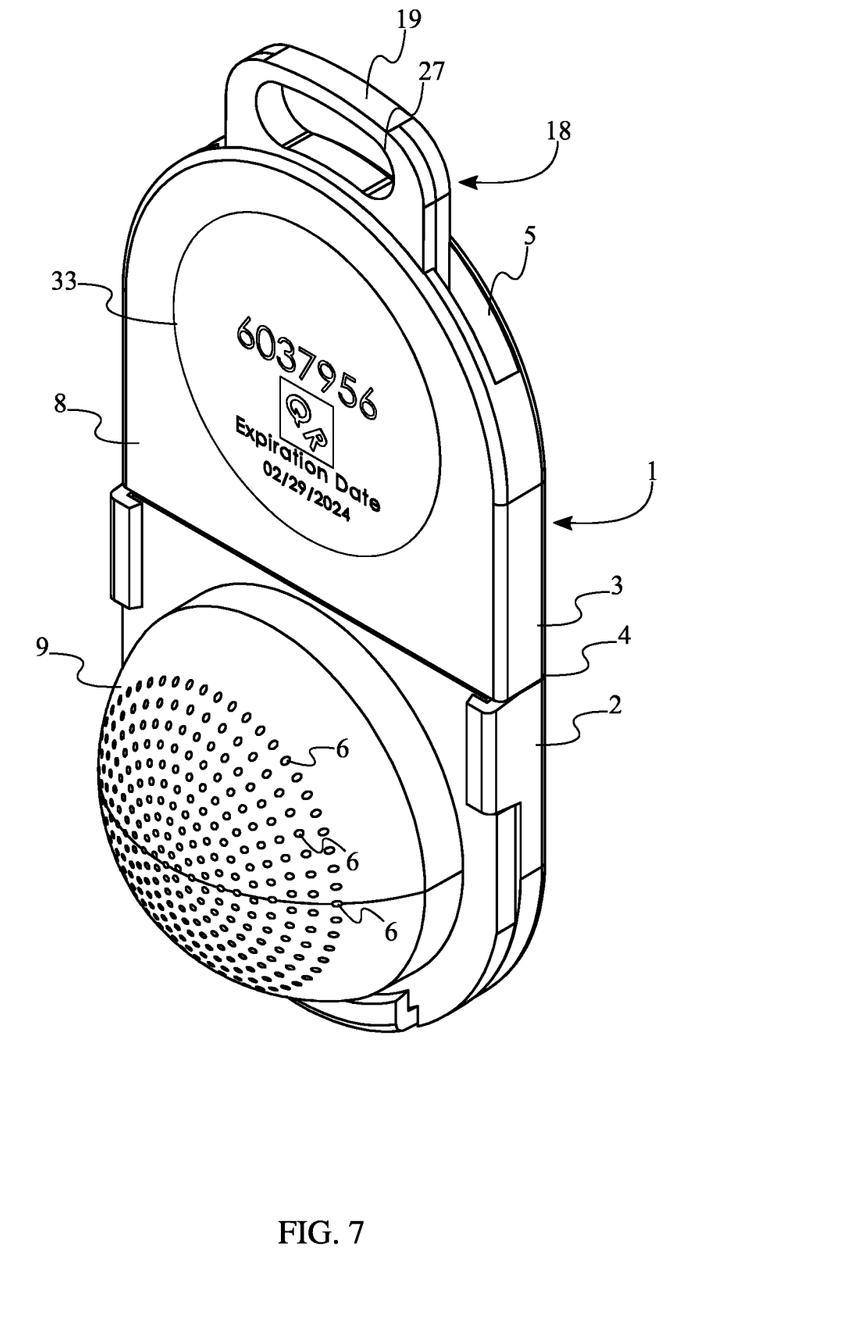
FIG. 7 is a perspective view of an alternate embodiment of the present invention in an activated configuration.
Figure 8:
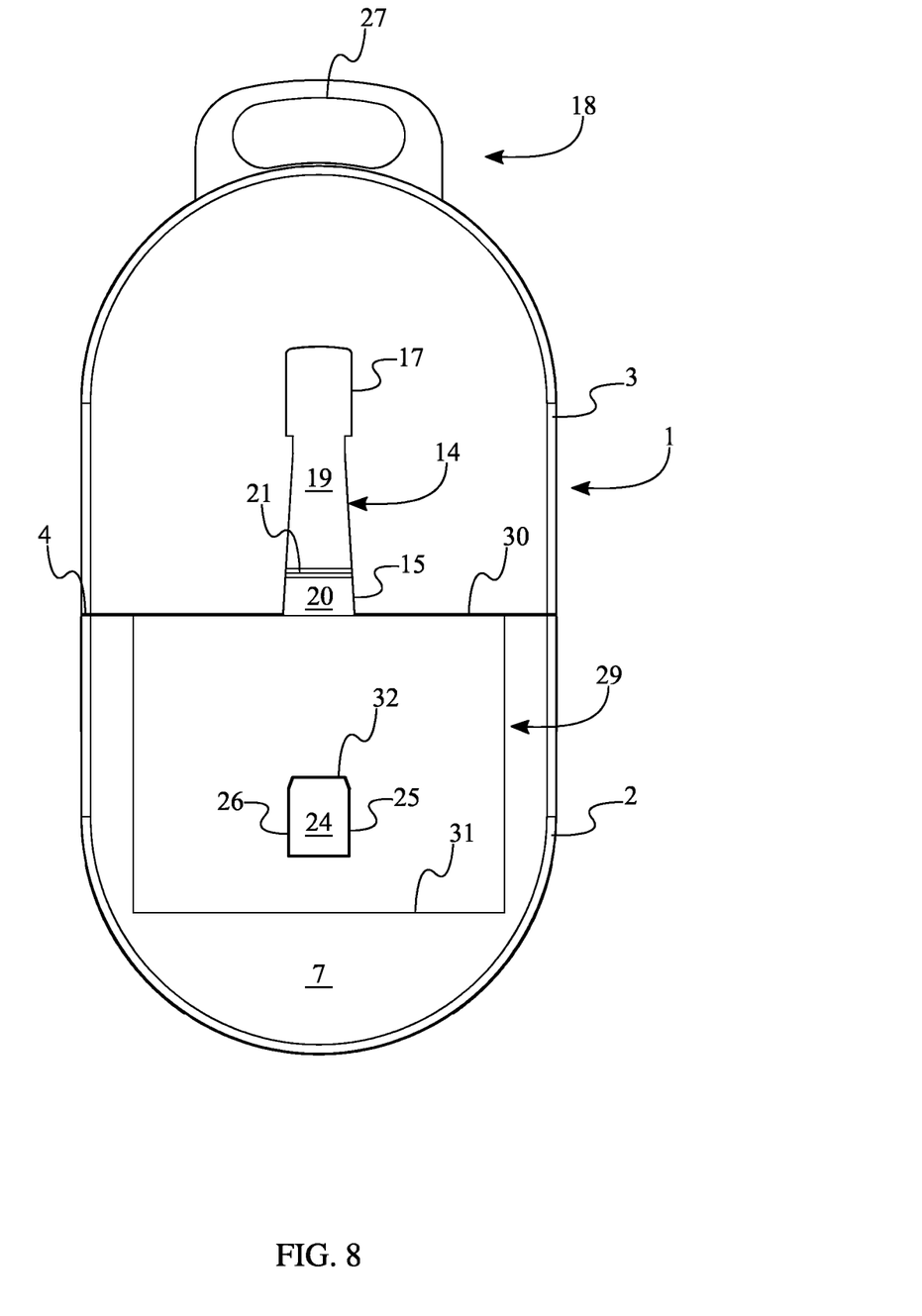
FIG. 8 is a rear side view of the alternate embodiment of the present invention.
Figure 9:
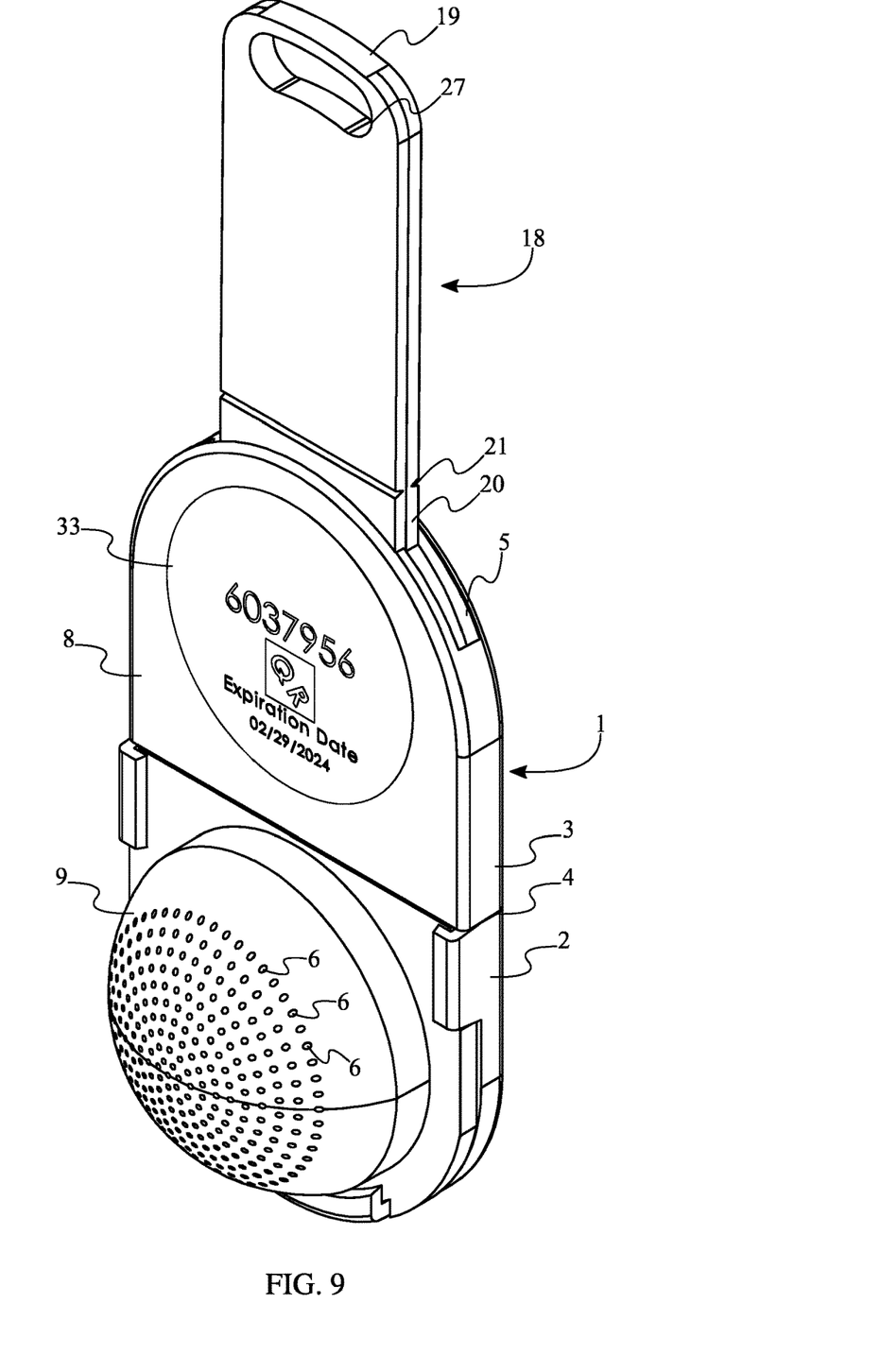
FIG. 9 is a perspective view of the alternate embodiment of the present invention in a stored configuration.
Figure 10:
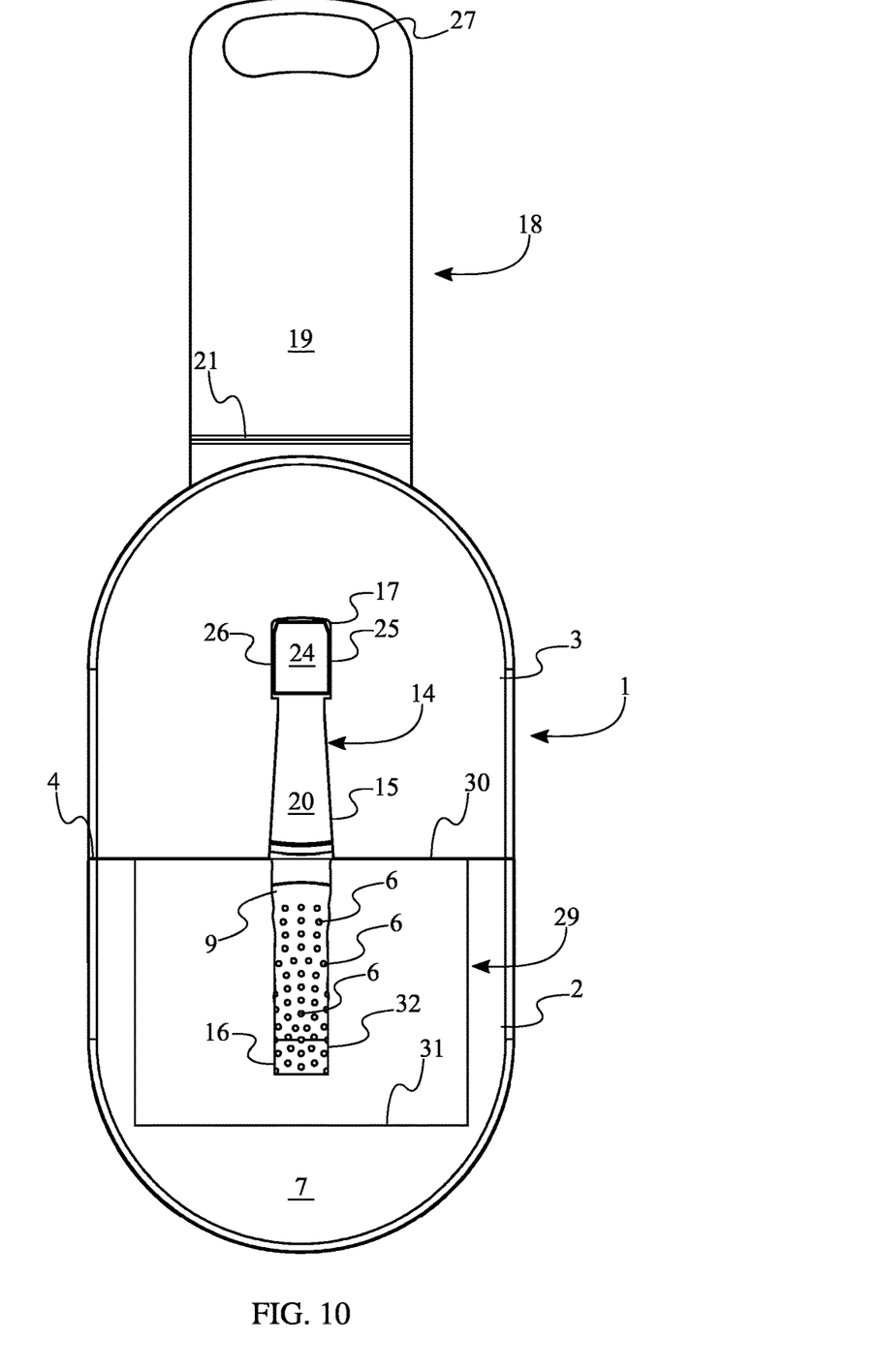
FIG. 10 is a rear side view of the alternate embodiment of the present invention.
Figure 11:
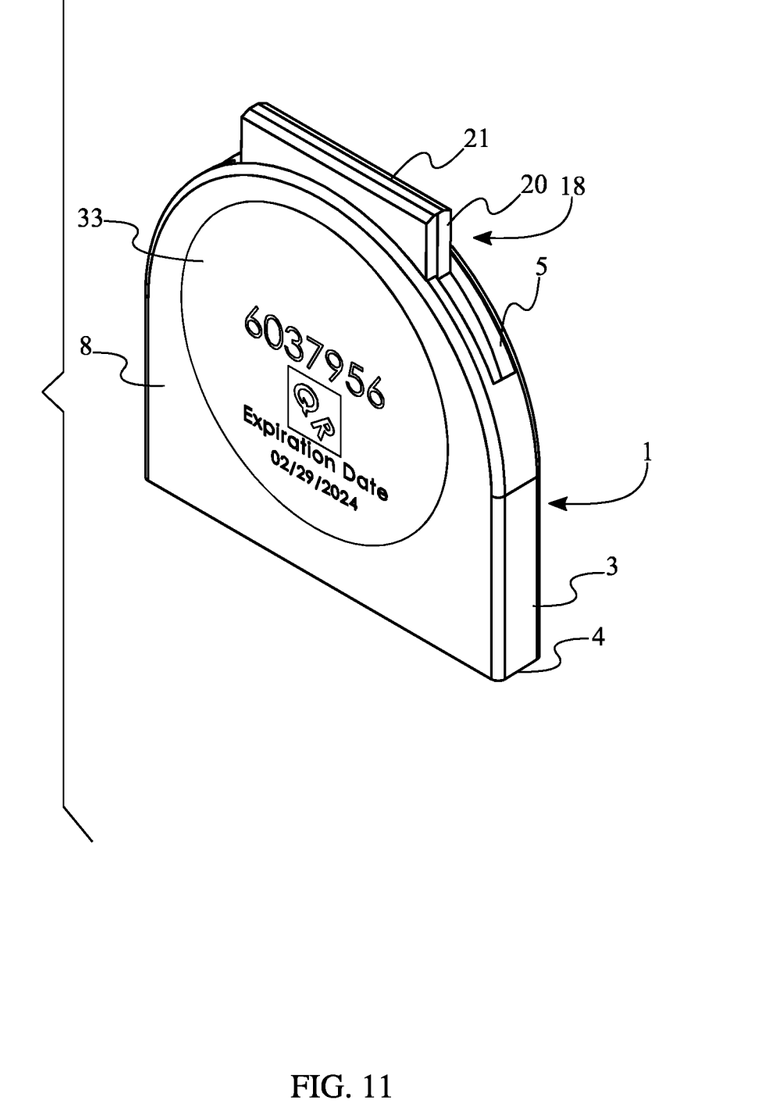
FIG. 11 is a perspective view of the alternate embodiment of the present invention in the stored configuration broken along a first breakaway line and a second breakaway line.

In an alternate embodiment of the present invention, the setting member 20 is locked within the storage portion 3 while in a stored configuration as the housing 1 further comprises a proximal surface 7, a distal surface 8, and a track 14, seen in FIG. 8 and FIG. 10. Moreover, the elongated member may further comprise a wedging stopper 24. The track 14 allows the wedging stopper 24 to traverse from the receptacle portion 2 and into the storage portion 3. The wedging stopper 24 prevents the setting member 20 from sliding back out of the storage portion 3. The linear sliding movement of the elongated plate 18 remains uninhibited as the track 14 is positioned along the plate-receiving slot 5. As in the preferred embodiment of the present invention, the proximal surface 7 is positioned opposite the distal surface 8 about the housing 1. Furthermore, the proximal surface 7 extends between the receptacle portion 2 and the storage portion 3, and the distal surface 8 extends between the receptacle portion 2 and the storage portion 3. The radon-detecting foil strip 28 remains uninhibited as the track 14 is positioned adjacent with the proximal surface 7. Moreover, the structural integrity of the storage portion 3 is preserved as the track 14 only extends a minimal distance along the storage portion 3. As the plate-receiving slot 5 is positioned perpendicularly with the first breakaway line 4, the track 14 is positioned perpendicular and adjacent with the first breakaway line 4. The track 14 preferably traverses across both the receptacle portion 2 and the storage portion 3. The wedging stopper 24 latches with the housing 1 as the track 14 laterally traverses through the storage portion 3 and into the plate-receiving slot 5. More specifically, the wedging stopper 24 is centrally positioned with the setting member 20. The wedging stopper 24 is fixed onto the setting member 20, opposite the radon-detecting foil strip 28, thereby allowing the setting member 20 to remain locked into the storage portion 3 while the radon-detecting strip remains uninhibited. The elongated plate 18 freely slides until secured in the stored configuration as the wedging stopper 24 is slidably engaged within the track 14.

In order for the wedging stopper 24 to readily latch with the housing 1 while in the stored configuration, the track 14 may comprise a raceway 15, an open end 16, and a locking end 17, also seen in FIG. 8 and FIG. 10. The raceway 15 provides the path for the wedging stopper 24 from the receptacle portion 2 into the storage portion 3. The open end 16 positions the setting member 20 within the receptacle portion 2 and in the activated configuration. The locking end 17 positions the setting member 20 within the storage portion 3 and in the stored configuration. A width of the open end 16 is equal to a width of the locking end 17, and a width of the raceway 15 tapers form the open end 16 up until the locking end 17, preventing the wedging stopper 24 from escaping from the locking end 17 and allowing the wedging stopper 24 to latch with the housing 1 along the raceway 15 and into the locking end 17. In order for the wedging stopper 24 to engage with the raceway 15, the wedging stopper 24 may comprise a first guide edge 25 and a second guide edge 26. The open end 16 is positioned with the raceway 15, offset the first breakaway line 4. Moreover, the open end 16 is positioned adjacent with the receptacle portion 2. The locking end 17 is terminally positioned with the raceway 15, opposite the open end 16. Moreover, the locking end 17 is positioned adjacent with the storage portion 3. In order to engage with the raceway 15 and be latched into the locking end 17, the first guide edge 25 is positioned opposite the second guide edge 26 about the wedging stopper 24. The first guide edge 25 and the second guide edge 26 are slidably engaged in between the raceway 15, allowing the wedging stopper 24 to slide along with the elongated plate 18.

This alternate embodiment of the present invention may further comprise a tamper indicator sheet 29 and a stopper hole 32, seen in FIG. 8 and FIG. 10. The tamper indicator visually alerts a user that the elongated plate 18 has be put in the stored configuration from a previous use. More specifically, the previous use of the present invention cannot be concealed by patching the tamper indicator sheet 29. The tamper indicator sheet 29 may comprise a proximal sheet edge 30 and a distal sheet edge 31, thereby defining a height for the tamper indicator sheet 29. The stopper hole 32 provides access for the wedging stopper 24 through the tamper indicator sheet 29 while in an activated configuration and preserves the structural integrity of the tamper indicator sheet 29. In order for the tamper indicator sheet 29 to be readily viewed by the user, the tamper indicator sheet 29 is externally positioned with the housing 1 and is fixed across the receptacle portion 2. In order for the wedging stopper 24 to rip through the tamper indicator sheet 29 once positioned into the stored configuration, the tamper indicator sheet 29 is positioned opposite the plurality of air passages 6 about the housing 1. Furthermore, the plurality of air passages 6 remains uninhibited as well. In order for the wedging stopper 24 to traverse across the tamper indicator sheet 29, the proximal sheet edge 30 is positioned adjacent with the first breakaway line 4, and the distal sheet edge 31 is positioned opposite the proximal sheet edge 30 across the tamper indicator sheet 29.

The stopper hole 32 is positioned adjacent with the distal sheet edge 31, thereby corresponding with the position of the wedging stopper 24 while in the activated configuration. The wedging stopper 24 does not accidentally damage or completely rip the tamper indicator sheet 29 as the stopper hole 32 traverses through the tamper indicator sheet 29. Moreover, the wedging stopper 24 is positioned through the stopper hole 32.

The preferred embodiment of the present invention and various alternative embodiments of the present invention may further comprise a device-identifying sticker 33, seen in FIG. 1, FIG. 4, FIG. 7, FIG. 9, and FIG. 11. The device-identifying sticker 33 provides information for a verified laboratory analyst or technician with the environment or area associated with the corresponding radon-detecting foil strip 28 within the storage portion 3. The device-identifying sticker 33 may provide a variety of information such as a contact name, contact information, address, and so on. The device-identifying sticker 33 preferably includes a barcode such as a QR code. In order for a verified laboratory analyst or technician to view or scan the device-identifying sticker 33, the device-identifying sticker 33 is externally positioned with the housing 1 and is fixed across the storage portion 3 as the receptacle portion 2 is separated from the storage portion 3 before transportation. Moreover, the device-identifying sticker 33 is positioned adjacent to the plurality of air passages 6 so that the device-identifying sticker 33 is readily seen while worn in an environment or area or disabled in a laboratory for analysis.

In order for the present invention to be easily secured onto the clothing or accessory of a user, the elongated plate 18 may further comprise a ring hole 27, seen in FIG. 1, FIG. 3, FIG. 4, FIG. 6, FIG. 7, FIG. 8, FIG. 9, and FIG. 10. The ring hole 27 allows the present invention to be attached around the body of the user or onto the clothing of the user with a fastener. For example, a lanyard may be strung through the ring hole 27 and be worn around the neck of the user. In order for the ring hole 27 to be readily accessible outside of the housing 1, the ring hole 27 is terminally positioned with the grasping member 19, opposite the setting member 20. A fastener may be secured with the elongated plate 18 as the ring hole 27 laterally traverses through the grasping member 19.

Although the invention has been explained in relation to its preferred embodiment, it is to be understood that many other possible modifications and variations can be made without departing from the spirit and scope of the invention as hereinafter claimed.

What is claimed is:
1. A wearable radon detector comprising:
a housing;
an elongated plate;
a radon-detecting foil strip;

the housing comprising a receptacle portion, a storage portion, a first breakaway line, a plate-receiving slot, and a plurality of air passages;
the elongated plate comprising a grasping member, a setting member, and a second breakaway line;
the receptacle portion being fixed adjacent with the storage portion;
the first breakaway line being positioned in between the receptacle portion and the storage portion;
the first breakaway line being laterally integrated into and around the housing;
the plate-receiving slot traversing through the storage portion and into the receptacle portion;
the grasping member being fixed adjacent with the setting member;
the second breakaway line being positioned in between the grasping member and the setting member;
the second breakaway line being laterally integrated into and around the elongated plate;
the elongated plate being slidably engaged through the plate-receiving slot;
the radon-detecting foil strip being fixed across the setting member; and
the plurality of air passages traversing into the receptacle portion.

2. The wearable radon detector as claimed in claim 1 comprising:
the housing further comprising a proximal surface, a distal surface, and a hemispherical basin;
the proximal surface being positioned opposite the distal surface about the housing;
the proximal surface extending between the receptacle portion and the storage portion;
the distal surface extending between the receptacle portion and the storage portion;
the hemispherical basin being positioned adjacent with the receptacle portion;
the hemispherical basin being integrated into the distal surface;
the plurality of air passages traversing through the hemispherical basin; and
each of the plurality of air passages being oriented towards a focal detection area of the hemispherical basin.

3. The wearable radon detector as claimed in claim 1 comprising:
the housing further comprising a first barb-receiving hole and a second barb-receiving hole;
the elongated plate further comprising a first barb and a second barb;
the first barb-receiving hole and the second barb-receiving hole laterally traversing through the storage portion and into the plate-receiving slot;
the first barb-receiving hole and the second barb-receiving hole positioned offset from the first breakaway line;
the first barb-receiving hole and the second barb-receiving hole being positioned opposite to each other about the plate-receiving slot;
the first barb being laterally fixed to the setting member; and
the second barb being laterally fixed to the setting member, opposite to the first barb.

4. The wearable radon detector as claimed in claim 3 comprising:
the housing further comprising a first barb-bracing stop and a second barb-bracing stop;
the first barb-bracing stop and the second barb-bracing stop being fixed within the receptacle portion;
the first barb-bracing stop and the second barb-bracing stop positioned into the plate-receiving slot;
the first barb-bracing stop and the second barb-bracing stop being positioned opposite to each other about the plate-receiving slot; and
the first barb-bracing stop and the second barb-bracing stop being positioned adjacent to the first breakaway line.

5. The wearable radon detector as claimed in claim 1 comprising:
the housing further comprising a proximal surface, a distal surface, and a track;
the elongated member further comprising a wedging stopper;
the track being positioned along the plate-receiving slot;
the proximal surface being positioned opposite the distal surface about the housing;
the proximal surface extending between the receptacle portion and the storage portion;
the distal surface extending between the receptacle portion and the storage portion;
the track being positioned adjacent with the proximal surface;
the track being positioned perpendicular and adjacent with the first breakaway line;
the track laterally traversing through the storage portion and into the plate-receiving slot;
the wedging stopper being centrally positioned with the setting member;
the wedging stopper being fixed onto the setting member, opposite the radon-detecting foil strip; and
the wedging stopper being slidably engaged into the track.

6. The wearable radon detector as claimed in claim 5 comprising:
the track comprising a raceway, an open end, and a locking end;
the wedging stopper comprising a first guide edge and a second guide edge;
the open end being positioned with the raceway, offset from the first breakaway line;
the locking end being terminally positioned with the raceway, opposite the open end;
the first guide edge being positioned opposite the second guide edge about the wedging stopper; and
the first guide edge and the second guide edge being slidably engaged in between the raceway.

7. The wearable radon detector as claimed in claim 6, wherein a width of the open end is equal to a width of the locking end, and wherein a width of the raceway tapers from the open end up until the locking end.

8. The wearable radon detector as claimed in claim 5 comprising:
a tamper indicator sheet;
a stopper hole;
the tamper indicator sheet comprising a proximal sheet edge and a distal sheet edge;
the tamper indicator sheet being externally positioned with the housing;
the tamper indicator sheet being fixed across the receptacle portion;
the tamper indicator sheet being positioned opposite the plurality of air passages about the housing;
the proximal sheet edge being positioned adjacent with the first breakaway line;

the distal sheet edge being positioned opposite the proximal sheet edge across the tamper indicator sheet;
the stopper hole being positioned adjacent with the distal sheet edge;
the stopper hole traversing through the tamper indicator sheet;
the wedging stopper being positioned through the stopper hole.

9. The wearable radon detector as claimed in claim 1 comprising:
a device-identifying sticker;
the device-identifying sticker being externally positioned with the housing;
the device-identifying sticker being fixed across the storage portion; and
the device-identifying sticker being positioned adjacent to the plurality of air passages.

10. The wearable radon detector as claimed in claim 1 comprising:
the elongated plate further comprising a ring hole;
the ring hole being terminally positioned with the grasping member, opposite the setting member; and
the ring hole laterally traversing through the grasping member.

11. A wearable radon detector comprising:
a housing;
an elongated plate;
a radon-detecting foil strip;
a device-identifying sticker;
the housing comprising a receptacle portion, a storage portion, a first breakaway line, a plate-receiving slot, and a plurality of air passages;
the elongated plate comprising a grasping member, a setting member, and a second breakaway line;
the receptacle portion being fixed adjacent with the storage portion;
the first breakaway line being positioned in between the receptacle portion and the storage portion;
the first breakaway line being laterally integrated into and around the housing;
the plate-receiving slot traversing through the storage portion and into the receptacle portion;
the grasping member being fixed adjacent with the setting member;
the second breakaway line being positioned in between the grasping member and the setting member;
the second breakaway line being laterally integrated into and around the elongated plate;
the elongated plate being slidably engaged through the plate-receiving slot;
the radon-detecting foil strip being fixed across the setting member;
the plurality of air passages traversing into the receptacle portion;
the device-identifying sticker being externally positioned with the housing;
the device-identifying sticker being fixed across the storage portion; and
the device-identifying sticker being positioned adjacent to the plurality of air passages.

12. The wearable radon detector as claimed in claim 11 comprising:
the housing further comprising a proximal surface, a distal surface, and a hemispherical basin;
the proximal surface being positioned opposite the distal surface about the housing;
the proximal surface extending between the receptacle portion and the storage portion;
the distal surface extending between the receptacle portion and the storage portion;
the hemispherical basin being positioned adjacent with the receptacle portion;
the hemispherical basin being integrated into the distal surface;
the plurality of air passages traversing through the hemispherical basin; and
each of the plurality of air passages being oriented towards a focal detection area of the hemispherical basin.

13. The wearable radon detector as claimed in claim 11 comprising:
the housing further comprising a first barb-receiving hole and a second barb-receiving hole;
the elongated plate further comprising a first barb and a second barb;
the first barb-receiving hole and the second barb-receiving hole laterally traversing through the storage portion and into the plate-receiving slot;
the first barb-receiving hole and the second barb-receiving hole positioned offset from the first breakaway line;
the first barb-receiving hole and the second barb-receiving hole being positioned opposite to each other about the plate-receiving slot;
the first barb being laterally fixed to the setting member; and
the second barb being laterally fixed to the setting member, opposite to the first barb.

14. The wearable radon detector as claimed in claim 13 comprising:
the housing further comprising a first barb-bracing stop and a second barb-bracing stop;
the first barb-bracing stop and the second barb-bracing stop being fixed within the receptacle portion;
the first barb-bracing stop and the second barb-bracing stop positioned into the plate-receiving slot;
the first barb-bracing stop and the second barb-bracing stop being positioned opposite to each other about the plate-receiving slot; and
the first barb-bracing stop and the second barb-bracing stop being positioned adjacent to the first breakaway line.

15. The wearable radon detector as claimed in claim 11 comprising:
the housing further comprising a proximal surface, a distal surface, and a track;
the elongated member further comprising a wedging stopper;
the track being positioned along the plate-receiving slot;
the proximal surface being positioned opposite the distal surface about the housing;
the proximal surface extending between the receptacle portion and the storage portion;
the distal surface extending between the receptacle portion and the storage portion;
the track being positioned adjacent with the proximal surface;
the track being positioned perpendicular and adjacent with the first breakaway line;
the track laterally traversing through the storage portion and into the plate-receiving slot;
the wedging stopper being centrally positioned with the setting member;

the wedging stopper being fixed onto the setting member, opposite the radon-detecting foil strip; and the wedging stopper being slidably engaged into the track.

16. The wearable radon detector as claimed in claim 15 comprising:

the track comprising a raceway, an open end, and a locking end;

the wedging stopper comprising a first guide edge and a second guide edge;

the open end being positioned with the raceway, offset from the first breakaway line;

the locking end being terminally positioned with the raceway, opposite the open end;

the first guide edge being positioned opposite the second guide edge about the wedging stopper; and the first guide edge and the second guide edge being slidably engaged in between the raceway.

17. The wearable radon detector as claimed in claim 16, wherein a width of the open end is equal to a width of the locking end, and wherein a width of the raceway tapers from the open end up until the locking end.

18. The wearable radon detector as claimed in claim 15 comprising:

a tamper indicator sheet;

a stopper hole;

the tamper indicator sheet comprising a proximal sheet edge and a distal sheet edge;

the tamper indicator sheet being externally positioned with the housing;

the tamper indicator sheet being fixed across the receptacle portion;

the tamper indicator sheet being positioned opposite the plurality of air passages about the housing;

the proximal sheet edge being positioned adjacent with the first breakaway line;

the distal sheet edge being positioned opposite the proximal sheet edge across the tamper indicator sheet;

the stopper hole being positioned adjacent with the distal sheet edge;

the stopper hole traversing through the tamper indicator sheet; and the wedging stopper being positioned through the stopper hole.

19. The wearable radon detector as claimed in claim 11 comprising:

the elongated plate further comprising a ring hole;

the ring hole being terminally positioned with the grasping member, opposite the setting member; and the ring hole laterally traversing through the grasping member.

* * * * *